No. 702,254. Patented June 10, 1902.
H. A. STOCKMAN.
BOLT LOCK.
(Application filed July 16, 1901.)
(No Model.)
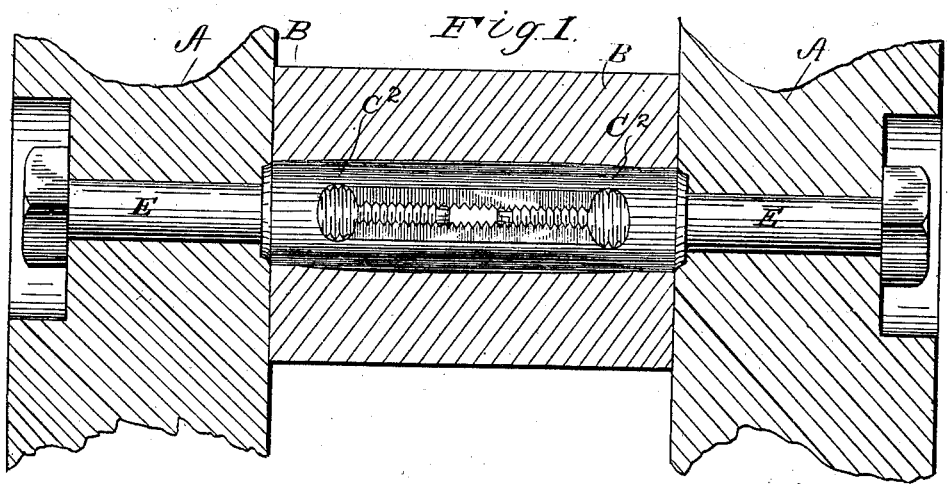
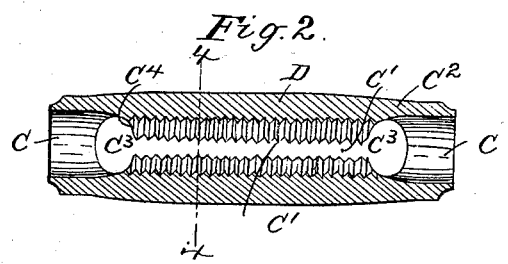
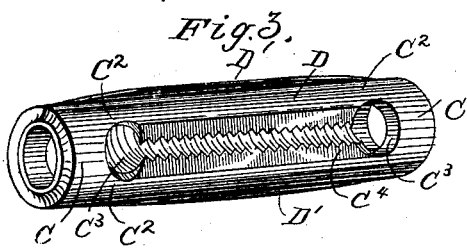
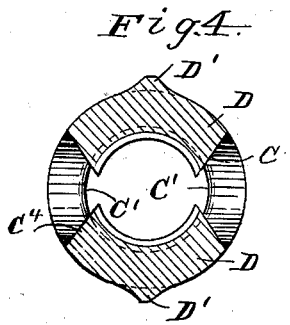
WITNESSES:
INVENTOR
Harry A. Stockman
BY Munn & Co.
ATTORNEYS

United States Patent Office.

HARRY A. STOCKMAN, OF JOHANNESBURG, SOUTH AFRICAN REPUBLIC.

BOLT-LOCK.

SPECIFICATION forming part of Letters Patent No. 702,254, dated June 10, 1902.

Application filed July 16, 1901. Serial No. 68,484. (No model.)

*To all whom it may concern:*

Be it known that I, HARRY A. STOCKMAN, a subject of the King of Sweden and Norway, residing at Johannesburg, South African Republic, have made certain new and useful Improvements in Bolt-Locks, of which the following is a specification.

My invention is an improvement in bolt-locks, which while it is designed especially for use in mine-shafts for securing the upright guides to the cross-timbers will be found useful in other locations wherever it is desired to bolt timbers together which are subjected to vibration which tend to loosen them, as in bridges and like structures; and the invention consists in certain novel constructions and combinations of parts, as will be hereinafter described and claimed.

In the drawings, Figure 1 is a vertical longitudinal section of my holder as in use. Fig. 2 is a longitudinal section of the holder. Fig. 3 is a perspective view thereof, and Fig. 4 is a cross-section of the holder on about line 4 4 of Fig. 2.

In mines where it is desired simply to secure the guides or runners and the cross-timbers, such as A and B, together difficulty is experienced by reason of the bolts being jarred loose and projecting from the outer beams, thus loosening the joints and furnishing projections into the path of cages or other movable objects, which frequently result in damage to the fixtures in the mine and injury and loss of life. Also by the rusting of the parts when the bolts are passed through the wooden beams and secured by nuts they become locked so firmly therein at times as to render it practically impossible to remove them. By my invention I seek to provide means whereby the bolts will be held from jarring loose, and yet can be readily removed whenever desired. To this end I provide a holder such as shown in the drawings, and which is preferably made of brass or other metal which will not readily oxidize and is so formed as to be compressed when seated in its supporting-beam so it will bind upon the bolts and prevent the same from turning.

As shown and preferred, the holder is in the form of a tubular body formed with end rings C and between the same with longitudinal diametrically opposite slots C', which are enlarged circumferentially at their opposite ends, forming narrow necks $C^2$ at the ends of the bars formed by the said slots, which necks separate the end openings $C^3$ of the opposite slots. The walls of the slots flare outwardly at $C^4$, and the bars D, produced by the slots C', are threaded internally throughout their lengths between the end openings $C^3$, while the necks $C^2$ and the rings C at the ends of the body are unthreaded. The bars D are provided on their outer sides at their centers with the longitudinally-extending ribs D', which preferably taper slightly toward their opposite ends to facilitate the introduction of the holder into a beam.

In practice the holders are made with the threaded bore of the bars D formed to fit the bolts E which are to be used, and the hole A' in the beam A to receive the holder is made slightly smaller than such holder, so the latter when it is driven into the hole A' will be so compressed as to reduce the diameter of its threaded bore to such an extent as to cause the holder to firmly grip the bolts when they are turned home, as shown in Fig. 1, and so prevent the same from accidentally jarring loose. When the holder is driven into the hole A', the ribs D' will operate to prevent the same from turning, and such ribs by their tapering or sloped formation at their ends will aid in compressing the bars D, as desired. It will also be noticed that this compression of the holder will be facilitated by the narrow necks produced at the ends of the bars D by enlarging the ends of the slots C', as before described.

Having thus described my invention, what I claim, and desire to secure by Letters Patent, is—

1. The bolt-holder herein described consisting of a tubular body having end rings and longitudinal slots on diametrically opposite lines extending between the said rings and provided at their ends with enlarged portions producing narrow necks at the ends of the bars formed by said slots and between the same and the end rings and having such bars threaded internally and the end rings unthreaded, the bars being provided with the longitudinal outwardly-projecting ribs all substantially as and for the purposes set forth.

2. A bolt-holder having the end rings, the longitudinal slots between the same forming the separated bars and enlarged at their ends producing the narrow necks at the ends of said bars, the said bars being threaded internally substantially as set forth.

3. A bolt-holder having the continuous end rings and provided between the same with the separated internally-threaded compressible bars substantially as set forth.

4. A bolt-holder comprising the end rings, and the sepatated bars connecting the said rings and provided at their juncture with the rings with reduced necks, the bars being threaded internally and the necks and rings being unthreaded substantially as set forth.

5. The bolt-holder herein described consisting of the tubular body having the end rings, and the longitudinal slots forming the bars and enlarged at their ends producing the narrow necks connecting said rings and bars, the bars being threaded internally substantially as set forth.

HARRY A. STOCKMAN.

Witnesses:
JOHN FARMAGE,
JAS. D. RANDALL.